United States Patent [19]

van der Meer et al.

[11] Patent Number: 5,776,354
[45] Date of Patent: Jul. 7, 1998

[54] USE OF A POROUS, PARTICULATE MATERIAL IN A PACKED FILTER BED FOR LIQUID/GAS AND/OR LIQUID/LIQUID SEPARATION

[75] Inventors: Abele Broer van der Meer, EH Renkum; Elwin Schomaker, NX Velp; Johannes Bos, BG Westervoort; Erik Leonard Middelhoek, GH Arnhem, all of Netherlands

[73] Assignee: Akzo Nobel NV, Arnhem, Netherlands

[21] Appl. No.: 457,005

[22] Filed: Jun. 1, 1995

[30] Foreign Application Priority Data

Jun. 1, 1994 [NL] Netherlands .......... 9400892

[51] Int. Cl.$^6$ .......... B01D 21/26; B01D 15/04
[52] U.S. Cl. .......... 210/806; 210/690; 210/692; 210/693; 210/787; 210/792; 422/72; 35/257.4; 95/211; 95/274
[58] Field of Search .......... 210/360.1, 380.1, 210/671, 690, 691, 692, 693, 767, 781, 787, 792, 500.1, 806, 924; 422/72; 55/257.4; 95/149, 211, 274, 273

[56] References Cited

U.S. PATENT DOCUMENTS

| | | |
|---|---|---|
| 4,172,031 | 10/1979 | Hall et al. . |
| 4,247,498 | 1/1981 | Castro .......... 264/41 |
| 4,894,171 | 1/1990 | Nichols .......... 210/781 |
| 5,135,660 | 8/1992 | Chromecek et al. .......... 210/671 |

FOREIGN PATENT DOCUMENTS

| | | |
|---|---|---|
| 0 370 259 | 5/1990 | European Pat. Off. . |
| 2 401 116 | 1/1974 | Germany . |
| 41 26 944 | 8/1991 | Germany . |
| 2 128 495 | 10/1982 | United Kingdom . |
| WO 84/03449 | 9/1984 | WIPO . |
| WO 94/03249 | 2/1994 | WIPO . |

OTHER PUBLICATIONS

"Magnetic Filtration Of Small Heterogeneous Catalyst Particles. Preparation Of Ferrimagnetic Catalyst Supports", Ind. Eng. Chem., Process Des. Dev., vol. 15, No. 1, 1976, pp. 226–227.

*Primary Examiner*—David A. Reifsnyder
*Attorney, Agent, or Firm*—Joseph M. Noto; Loretta A. Miraglia; Louis A. Morris

[57] ABSTRACT

A method for the use of a porous, preferably dimensionally stable, particulate material in a packed filter bed for separating a disperse liquid phase from a gas and/or separating a disperse liquid phase from a liquid, with the average size of the particles being in the range of from 0.1 to 10 mm and the internal surface area of the material being such that, after it has been filled with the disperse liquid phase to be separated and placed, as a packed bed, at a distance of from R to r from the center in a centrifuge rotating at an angular velocity w, for which it holds that $$0 < w^2(R^2 - r^2) \leq 20 \ (rad/s)^2 m^2,$$

wherein w stands for the angular velocity (in rad/s) and R and r represent the largest and the smallest radius (in m), respectively, of the material in the centrifuge, at least 1% of the liquid will have been separated after 5 minutes, while at least 10% of the liquid will have been separated after 60 minutes is disclosed.

8 Claims, 1 Drawing Sheet

Packed bed with filled particles

USE OF A POROUS, PARTICULATE MATERIAL IN A PACKED FILTER BED FOR LIQUID/GAS AND/OR LIQUID/LIQUID SEPARATION

CROSS REFERENCE TO RELATED APPLICATIONS

This application claims the benefit of the filing date of prior Netherlands Patent Application Serial Number 9,400,892, filed Jun. 1, 1994.

BACKGROUND OF THE INVENTION

1. Field of the Invention

The present invention relates to the use of a porous, preferably dimensionally stable, particulate material in a packed filter bed for separating a disperse liquid phase from a gas and/or separating a disperse liquid phase from a liquid, to a packed filter bed containing such a particulate material, and to the use of such a filter bed.

2. Description of the Related Art

The use of particulate material in a packed filter bed has been described, int. al., by McCarthy et al. in *Ind. Eng. Chem., Process Des. Dev.* 15 (1976), 226. The emphasis in this article is on the use of both packed and fluidised beds of small alumina granules of 135 µm in diameter for the collection of liquid dioctyl phthalate aerosols with a particle diameter of 1.4 to 0.06 µm. A fixed bed of 2.5 cm thick was reported to give a filtering efficiency of virtually 100%. The gas flow rate in that case should be just below the minimum fluidisation velocity. At higher rates the efficiency was found to be greatly reduced. Multistage filtration, however, will still give a high efficiency in such cases.

It should be noted that for the collection of liquid aerosols preference is given to the use of porous granules in order to increase bed capacity; in order to prevent flooding, portions of the bed are regularly replaced by as yet unfilled material.

For the removal of a disperse liquid phase, more particularly oil, floating on a liquid, more particularly water, U.S. Pat. No. 5,135,660 employs a macroporous, hydrophobic, highly cross-linked, polymethacrylate-based polymer. After the polymer has been allowed to absorb and become laden with oil, the polymer particles are recovered from the water, whereupon the oil is removed by applying compressive forces to the polymer particles, which are then recirculated for further use.

Such a method was reported to be highly effective in removing an oil film floating on the surface of the water. Such a method is less suited to be used for the continuous removal of finely divided oil from an aqueous process stream. In that case, the polymer particles as well as their interspaces are so small that the only way to remove the oil therefrom is by applying compressive forces.

SUMMARY OF THE INVENTION

In accordance with one aspect of the present invention, there is provided a method using a porous, preferably dimensionally stable, particulate material in a packed filter bed for separating a disperse liquid phase from at least one of a gas and a liquid, wherein the average size of the particles is in the range of from 0.1 to 10 mm and the internal surface area of the material is such that, after the bed has been filled with the disperse liquid phase to be separated and placed, as a packed bed, at a distance of from R to r from the center in a centrifuge rotating at an angular velocity w, for which it holds that $0 < w^2(R^2 - r^2) \leq 20$ $(rad/s)^2 m^2$, wherein w stands for the angular velocity (in rad/s) and R and r represent the largest and the smallest radius (in m), respectively, of the material in the centrifuge, at least 1% of the liquid will have been separated after 5 minutes, while at least 10% of the liquid will have been separated after 60 minutes.

In accordance with another aspect of the present invention, there is provided a packed filter bed in which the filter material employed is the porous particulate material noted above.

In accordance with a further aspect of the present invention, there is provided a method for separating a disperse liquid phase from at least one of a gas and a liquid, by use of the packed filter bed noted above, wherein the direction of flow through the cylindrical vessel is substantially vertical, resulting in coalescence of the disperse liquid phase, which is subsequently separated in the form of a liquid stream under the influence of at least one of gravity and centrifugal force.

In accordance with yet another aspect of the present invention, there is provided a method for separating a disperse liquid phase and a solid phase from at least one of a gas and a liquid by use of the packed filter bed noted above, wherein the filter bed is arranged in a vessel positioned substantially vertically with the inlet at the one end and the outlet at the other, which vessel has an increasing cross-sectional dimension in the direction of flow of the mixture, making expansion or fluidisation of the filter bed possible as pressure in the bed increases during operation, so that any solids present can be passed through, with the disperse liquid phase coalescing in the vessel having a substantially vertical direction of flow, to be subsequently separated in the form of a liquid stream under the influence of at least one of gravity and centrifugal force.

These and other aspects of the present invention will become apparent upon a review of the following detailed description and the claims appended thereto.

DETAILED DESCRIPTION OF PREFERRED EMBODIMENTS

Figure 1:
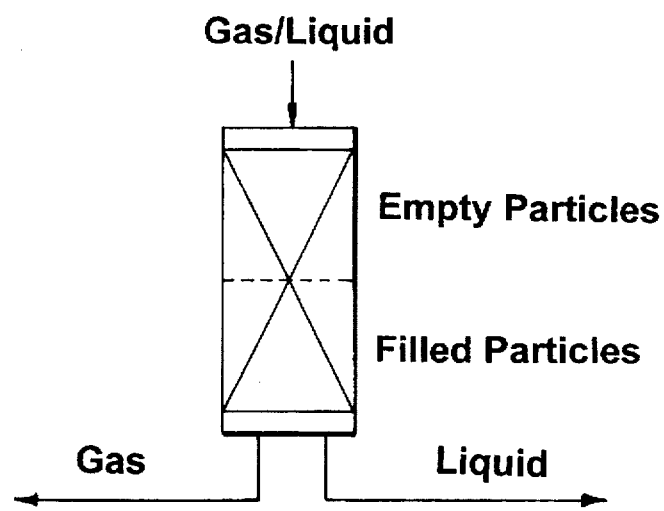
FIG. 1 shows a Gas/Liquid separation using a uniflow current and in situ regeneration.
Figure 2:
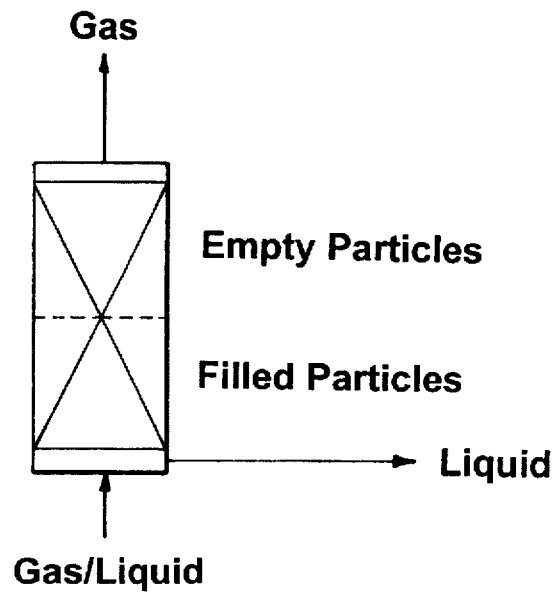
FIG. 2 shows a Gas/Liquid separation using a counter current and in situ regeneration.
Figure 3:
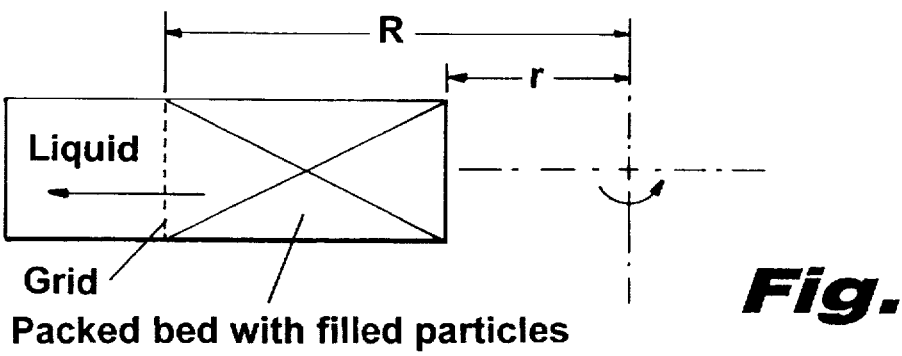
FIG. 3 shows a packed bed of filled particles placed in a tube of a centrifuge. The tube contains a grid through which the liquid will pass form the filled particles.

The present invention provides a method for the use of a porous, dimensionally stable, particulate material from which the liquid phase is easy to remove and where after the incorporation of the particles into a packed filter bed there will be few if any problems on account of flooding.

According to the present invention use is made of a porous, preferably dimensionally stable, particulate material in a packed filter bed, wherein the average size of the particles is in the range of 0.1 to 10 mm and the internal surface area of the material is such that, after it has been filled with the disperse liquid phase to be separated and placed, as a packed bed, at a distance of from R to r from the center in a centrifuge rotating at an angular velocity w, for which it holds that $$0 < w^2(R^2 - r^2) \leq 20 \ (rad/s)^2 m^2,$$

wherein w stands for the angular velocity (in rad/s) and R and r represent the largest and the smallest radius (in m), respectively, of the material in the centrifuge, at least 1% of the liquid will have been separated after 5 minutes, while at least 10% of the liquid will have been separated after 60 minutes.

By selecting a porous material satisfying the above criterion, the risk of the liquid phase being immobilized in the pores with no, or insufficient, capacity for removal therefrom, is averted.

In this context reference is made to WO 94/03249 (U.S. application Ser. No. 08/381,828), in which the use of a similar material is claimed for the extraction of hydrophobic constituents, such as benzene, toluene, xylene and/or chlorinated hydrocarbons, from an aqueous solution. The polymer particles described in this document have pores with an average diameter in the range of 0.1 to 50 μm. Because of these small pore dimensions, an oil, e.g., soybean oil, in a hydrophilic medium, e.g., water, absorbed therein can only be extracted by means of special steps.

For that reason, it must be considered highly surprising that the use in a packed bed of a porous material having a hydrophobic or a hydrophilic surface depending on whether the disperse liquid phase to be separated has hydrophobic or hydrophilic properties, and such an internal surface area as will allow compliance with the criterion indicated above, will enable a disperse liquid phase to be separated from a gas stream or a liquid stream without there being any serious problems due to flooding. Flooding is a process in which the gas stream is severely impeded by the liquid flowing in between the particles and thus filling up the interspaces. Another major advantage of the use of the present material resides in the fact that the material requires little if any regeneration.

The criteria to be met by the material suitable for the present use are related to the nature of the liquids to be separated, the particle size of the porous material, and the size of the pores in the material. The criteria can easily be established experimentally, considering the following. Qualifying for separating a hydrophobic liquid first and foremost is a hydrophobic material. In the case of a porous material with a cellular body/window structure, the diameter of more than 50% by volume of the bodies will generally be in the range of from 100 to 700 μm at an overall porosity of from 50 to 95% by volume, with preference being given to a material having an overall porosity of from 60 to 85% by volume. The pore diameter was determined by means of scanning electron microscopy combined with image analysis. If it is found that within the set criteria of 5 and 60 minutes, respectively, less than 1 and 10%, respectively, of the liquid to be separated is separated in the centrifuge test, the skilled person will have no difficulty in finding, by means of the alteration of one or more of the parameters, e.g., a more or less hydrophilic polymer, a higher porosity, and slightly larger pores, a material which does meet the set criteria. It goes without saying that only open structured pores can contribute in such a case.

Favorable results are generally attained when using a porous, particulate material where the porous particles are polymer particles of from 0.5 to 2 mm in size.

Examples of synthetic organic materials suitable to be made into the porous materials which may be used according to the present invention include, in particular, those which are used to make porous polymeric materials of a much finer pore structure such as that described in U.S. Pat. No. 4,247,498, which is incorporated herein by reference in its entirety.

Examples of hydrophobic polymers suitable for use in the present invention include: low pressure polyethylene, high pressure polyethylene, polypropylene, polystyrene, acrylonitrile-butadiene-styrene terpolymers, styrene-acrylonitrile copolymers, styrene-butadiene copolymers, poly(4-methyl-pentene-1), and polybutene.

Particular preference is given to polyolefin based polymers, especially polypropylene.

When the disperse liquid phase to be separated has hydrophilic properties, preference is given to a polymer which has hydrophilic properties also, such as polyvinyl acetate, a copolymer of vinyl acetate and vinyl alcohol, polyamide-2,2, polyamide-4,6, polyoxymethylene, polyethene-ketone, polyacrylonitrile, polyvinylidene chloride, and polysulphone.

An example of the preparation of the porous absorption material of the present invention is as follows: first, 10 to 40 wt. % of a polymer is dissolved, with heating, at a temperature above the upper critical phase separation temperature Tc in 60 to 90 wt. % of one or more liquid and miscible compounds A, B, C, etc., with the mixing ratio between these compounds being so selected as to give phase separation on cooling at a temperature which is at least 20° C. above the polymer melting point in the case of a crystalline polymer, or above the glass transition temperature Tg in the case of an amorphous polymer, resulting in a polymer-rich and a polymer-poor phase. On further lowering of the temperature at a cooling rate of less than 3° C./min this phase separation structure, due to vitrification or crystallization of the polymer, is then fixed prior to the completion of the phase separation, resulting in a porous polymer material filled with one or more of the compounds A, B, C, etc. which, after reduction to the desired particle size, is preeminently suited to be used within the framework of the invention. Generally speaking, an increase in the phase separation temperature gives increased dimensions of the bodies and the windows. It was found that this effect is further reinforced by a decrease of the cooling rate and/or a reduction of the polymer content.

The Tm was determined by the DSC method, using a TA-instruments apparatus at a heating rate of 20° C./minute.

The phase separation temperature was determined by optical microscopy in combination or not with phase contrast. To this end, the mixture was first homogenized at a temperature above the phase separation temperature and then cooled at a rate of 10° C./min, with the phase separation temperature being determined visually. When using polymer/solvent systems showing little difference in index of refraction, light scattering may be employed.

The present invention further pertains to a packed filter bed in which the filter material employed is a porous, particulate polymer according to the present invention. The packed filter bed generally is arranged in a vessel, preferably a cylindrical one.

The present invention also relates to the use of such a packed filter bed for separating a disperse liquid phase from a gas and/or a liquid, in which process the direction of flow through the preferably cylindrical vessel is substantially vertical, resulting in coalescence of the disperse liquid phase, which is subsequently separated in the form of a liquid stream under the influence of gravity and/or, optionally, centrifugal force.

Particularly when the gas and/or liquid stream to be filtered contains solid constituents, preference is given to the use of a packed filter bed arranged in a vessel positioned substantially vertically with the inlet at the one end and the outlet at the other, which vessel has increasing cross-sectional dimensions in the direction of flow of the mixture, making expansion or fluidisation of the filter bed possible as pressure in it increases during operation, so that any solids present can be passed through, with the disperse liquid phase coalescing in the vessel having a substantially vertical direction of flow, to be subsequently separated in the form of a liquid stream under the influence of gravity and/or, optionally, centrifugal force.

The present invention will be further illustrated with reference to the following specific examples. It is understood that these examples are given by way of illustration and are not meant to limit the disclosure or the claims to follow.

In order to be able to determine whether a material, once it is filled with a liquid to be separated, would release the liquid in a packed bed in conformity with the above criterion stipulating that after the filled material is placed at a distance of from R to r from the center in a centrifuge rotating at an angular velocity w, for which it holds that $0 < w^2(R^2-r^2) \leq 20$ $(rad/s)^2 m^2$, wherein w, R, and r have the aforementioned meaning, at least 1% of the liquid will have been separated after 5 minutes and at least 10% will have been separated after 60 minutes, the filled material was introduced into a Heraeus centrifuge (type Heraeus Varifuge F). Its operating conditions at all times were: R 139 mm, r 49 mm, and n 200 rev./min, which corresponds to an angular velocity w of 21 rad/s.

EXAMPLE I
Preparation of porous, particulate polymer 20 parts by weight (pbw) of polypropylene (type PM 6100, melting point 165° C., ex Shell) were mixed with 40 pbw of soybean oil (ex Vandermoortele) and 40 pbw of castor oil (Castrol) and then extruded in an extruder at 255° C. to form a homogeneous transparent solution, which was dropped into a stainless steel receptacle. The solution was cooled in air from 255° to 75° C. at a cooling rate of 3° to 0.5° C. per minute (average cooling rate 1.5° C. per minute). In this process liquid-liquid demixing occurred at a temperature of 210°±10° C. and crystallization of the polypropylene at 125°±5° C.

The resulting porous polymer had a porosity of 80% and a cellular body-window structure, with 75% by volume of the porous structure being composed of cells of an average diameter in the range of 200 to 400 μm (determined by scanning electron microscopy combined with image analysis). The material was then ground up into particles having an average diameter ($d_{0.5}$;v.v) of 1.1 mm (determined by light scattering using a 633 nm laser source with a Malvern particle sizer 2600C).

EXAMPLE II

In a manner analogous to that indicated in Example I, 22 pbw of polypropylene (type Klöckner C10 BB, melting point 166° C.) were mixed with 46 pbw of soybean oil and 31 pbw of castor oil and then extruded in an extruder at 250° C. to form a homogeneous transparent solution, which was dropped into a stainless steel receptacle. The solution was cooled in air from 255° to 75° C. at a cooling rate of 3° to 0.5° C. per minute (average cooling rate 1.5° C. per minute). Liquid-liquid demixing occurred at a temperature of 210°±10° C. and crystallization of the polypropylene at 125°±5° C. The resulting porous polymer had a porosity of 80% and a cellular body-window structure, with more than 75% by volume of the porous structure being composed of cells of an average diameter in the range of 100 to 150 μm (determined by scanning electron microscopy combined with image analysis). The material was then ground up into particles having an average diameter ($d_{0.5}$;v.v) of 0.55 mm (determined with the aid of a Malvern particle sizer 2600C).

EXAMPLE III

A glass cylindrical column of 1 m in length and 45 cm in diameter was filled up to a height of 38 cm with Example I's polypropylene particles filled partially with castor oil and soybean oil. The overall weight of the filling (polypropylene particles+castor oil and soybean oil) was 33 kg. To support the filled polymer particles the column was provided at the bottom with a perforated sheet with holes of about 1 mm in diameter, a free passage of about 23%, and a 5 cm thick layer of polyester granulate (diameter of the particles 3–4 mm).

Using a ventilator an aerosol stream was passed over the column. The aerosol stream was composed of a fine mist of an oil of which 35 wt.% consisted of a trimethylol propane ester, some non-ionic surface active compounds, an anionic surface active compound, ethanol, and water, with 65% consisting of a mineral oil fraction (ex Exxon).

At an average rate of flow of 330 m³/hour, an oil aerosol concentration of 335 mg/m³ at the inlet and 72 mg/m³ at the outlet, the yield was 79%. After an operating period of 700 hours a total of 55 kg of oil had been collected.

As soon as the material was saturated with the oil, 20.8 g was centrifuged in a centrifuge of the aforementioned type (ex Heraeus) at 200 r.p.m. After 5 minutes 35k of the oil had been removed from the material by centrifuging. After 60 minutes the amount had increased to 44%.

19.6 g of the material of Example II, which was filled with the same oil in a manner analogous to that indicated for the material of Example I, was also subjected to a centrifuge test. It was found that after 5 minutes 29% of the oil had been removed from the material. After 60 minutes the amount was 44%.

For comparison, a material of the same dimensions as indicated in Example I but with a cellular body-window structure having an average cell diameter in the range of 30 to 50 μm was filled with the same oil. 20.28 g of this material was subjected to a centrifuge test. Even after 60 minutes of centrifuging no oil was discharged.

EXAMPLE IV

In a manner analogous to that indicated in Example III a column was filled with Example II material to a packing height of 77 cm. The absorption material composed of polypropylene particles filled with soybean oil and castor oil had a weight of 63 kg.

Five experiments of 30 minutes each were carried out, at the end of which 105 g of oil was collected at the bottom of the filter bed. The collection efficiency for the oil aerosol at various concentrations is listed in the Table I below.

TABLE I

| rate of flow m³/hour | concentr. aerosol part. at inlet mg/m³ | concentr. aerosol part. at outlet mg/m³ | yield % |
|---|---|---|---|
| 332 | 219 | 34 | 84 |
| 376 | 193 | 27 | 86 |
| 301 | 219 | 28 | 87 |
| 211 | 266 | 26 | 90 |
| 113 | 331 | 22 | 93 |

EXAMPLE V

In a manner analogous to that indicated in Example III a 60 cm high column with a diameter of 27 mm was filled to a height of 50 cm with Example II material. The weight of the absorption material was 78 g.

TABLE II

| rate of flow l/min. | concentr. aerosol part. at inlet mg/m³ | concentr. aerosol part. at outlet mg/m³ | yield % |
| --- | --- | --- | --- |
| 4.8 | 160 | 25 | 84 |
| 3.3 | 160 | 5 | 97 |

EXAMPLE VI

In a manner analogous to that indicated in Example III a 60 cm high column with a diameter of 27 mm was filled to a height of 50 cm with Example I material. The weight of the absorption material was 75 g.

TABLE III

| rate of flow l/min. | concentr. aerosol part. at inlet mg/m³ | concentr. aerosol part. at outlet mg/m³ | yield % |
| --- | --- | --- | --- |
| 5.9 | 340 | 66 | 81 |
| 3.3 | 340 | 55 | 84 |

EXAMPLE VII

In a manner analogous to that indicated in Example V a 60 cm high column with a diameter of 27 mm was filled with Example II material from which oil had been removed at the start of the experiment. The height to which the column was filled again was 50 cm. The weight of the absorption material this time was only 41 g. The efficiency with which the oil aerosol was collected at various concentrations is listed in the Table IV below.

TABLE IV

| rate of flow l/min. | concentr. aerosol part. at inlet mg/m³ | concentr. aerosol part. at outlet mg/m³ | yield % |
| --- | --- | --- | --- |
| 5.9 | 340 | 7 | 98 |
| 3.3 | 340 | 4.5 | 99 |

EXAMPLE VIII

In a manner corresponding to that indicated in Example V a 60 cm high column with a diameter of 27 mm was filled with Example I material from which oil had been removed at the start of the experiment. The height to which the column was filled again was 50 cm. The weight of the absorption material this time was only 34 g. The efficiency with which the oil aerosol was collected at various concentrations is listed in the Table V below.

TABLE V

| rate of flow l/min. | concentr. aerosol part. at inlet mg/m³ | concentr. aerosol part. at outlet mg/m³ | yield % |
| --- | --- | --- | --- |
| 5.9 | 340 | 21 | 94 |
| 3.3 | 340 | 14 | 96 |

While the invention has been described with preferred embodiments, it is to be understood that variations and modifications are to be considered within the preview and the scope of the claims appended hereto.

What is claimed is:

1. A method comprising using a porous, dimensionally stable, particulate polymer material in a packed filter bed for separating a disperse liquid phase from at least one of a gas and a liquid, wherein the average size of the particles is in the range of from 0.5 to 2 mm and the internal surface area of the material is such that, after the bed has been filled with the disperse liquid phase to be separated and placed, as a packed bed, at a distance of from R to r from the center in a centrifuge rotating at an angular velocity w, for which it holds that $0<w^2(R^2-r^2)\leq 20$ $(rad/s)^2 m^2$, wherein w stands for the angular velocity (in rad/s) and R and r represent the largest and the smallest radius (in m), respectively, of the material in the centrifuge, at least 1% of the liquid will have been separated after 5 minutes, while at least 10% of the liquid will have been separated after 60 minutes.

2. The method according to claim 1, wherein said porous particulate polymer material has a cellular body/window structure, with the diameter of more than 50% by volume of the bodies being in the range of from 100 to 700 μm at an overall porosity of from 50 to 95% by volume.

3. The method according to claim 2, wherein said overall porosity is from 60 to 85% by volume.

4. The method according to claim 1, wherein said porous particulate polymer material comprises an organic polymer having hydrophobic properties.

5. The method according to claim 1, wherein said porous particulate polymer material comprises a material having hydrophilic properties.

6. The method according to claim 5, wherein said porous polymer particulate material is selected from the group consisting of an organic polymer of polyvinyl acetate, a copolymer of vinyl acetate and vinyl alcohol, polyamide-2,2, polyamide-4,6, polyoxymethylene, polyethene-ketone, polyacrylonitrile, polyvinylidene chloride, and polysulphone.

7. The method according to claim 1, wherein said porous particulate polymer material comprises a polyolefin.

8. The method according to claim 7, wherein said porous particulate polymer material comprises polypropylene.

* * * * *